United States Patent
Döll et al.

(10) Patent No.: US 8,125,188 B2
(45) Date of Patent: Feb. 28, 2012

(54) POWER MANAGEMENT SYSTEM

(75) Inventors: Walter Döll, Liebefeld-Bern (CH); Dirk Fielder, Lane Cove (AU); Markus Haller, Lausanne (CH)

(73) Assignee: Cochlear Limited, Macquarie University, NSW (AU)

( * ) Notice: Subject to any disclaimer, the term of this patent is extended or adjusted under 35 U.S.C. 154(b) by 758 days.

(21) Appl. No.: 10/552,974

(22) PCT Filed: Apr. 8, 2004

(86) PCT No.: PCT/AU2004/000464
§ 371 (c)(1),
(2), (4) Date: Jun. 28, 2006

(87) PCT Pub. No.: WO2004/091070
PCT Pub. Date: Oct. 21, 2004

(65) Prior Publication Data
US 2007/0268001 A1    Nov. 22, 2007

(30) Foreign Application Priority Data
Apr. 11, 2003  (AU) ................................ 2003901730

(51) Int. Cl.
*H02J 7/00*   (2006.01)

(52) U.S. Cl. .................................................... 320/134
(58) Field of Classification Search ................... 320/118, 320/119, 121, 134; 307/65, 66
See application file for complete search history.

(56) References Cited

U.S. PATENT DOCUMENTS

| | | | |
|---|---|---|---|
| 3,902,078 A | 8/1975 | Peterson | |
| 4,532,930 A | 8/1985 | Crosby et al. | |
| 5,279,292 A | 1/1994 | Baumann et al. | |
| 5,369,351 A | 11/1994 | Adams | |
| 5,411,537 A | 5/1995 | Munshi et al. | |
| 5,553,294 A * | 9/1996 | Nanno et al. | 713/340 |
| 5,635,814 A * | 6/1997 | Afzal et al. | 320/111 |
| 5,659,237 A | 8/1997 | Divan et al. | |
| 5,702,431 A | 12/1997 | Wang et al. | |
| 5,739,596 A | 4/1998 | Takizawa et al. | |
| 5,783,322 A | 7/1998 | Nagai et al. | |
| 5,814,095 A * | 9/1998 | Muller et al. | 607/57 |
| 5,869,970 A | 2/1999 | Palm et al. | |

(Continued)

FOREIGN PATENT DOCUMENTS
AU    200176077    3/2002
(Continued)

OTHER PUBLICATIONS

International Preliminary Report on Patentability for PCT/AU2004/000464, dated Jul. 29, 2005.

(Continued)

*Primary Examiner* — Adolf Berhane
*Assistant Examiner* — Jue Zhang
(74) *Attorney, Agent, or Firm* — Kilpatrick, Townsend & Stockton, LLP.

(57) ABSTRACT

A power management system for supplying power to an output circuit comprising a plurality of rechargeable batteries, a conversion means for converting a supply voltage to a battery voltage to enable charging of one or more of the rechargeable batteries and switch means to enable a selected battery of the plurality of rechargeable batteries to be connected to an output circuit to enable the selected battery to be discharged through the output circuit.

27 Claims, 5 Drawing Sheets

U.S. PATENT DOCUMENTS

| | | | |
|---|---|---|---|
| 5,903,764 | A | 5/1999 | Shyr et al. |
| 6,043,628 | A | 3/2000 | Perelle et al. |
| 6,067,474 | A | 5/2000 | Schulman et al. |
| 6,078,165 | A | 6/2000 | Ashtiani et al. |
| 6,143,440 | A | 11/2000 | Volz et al. |
| 6,223,077 | B1 | 4/2001 | Schweizer et al. |
| 6,271,643 | B1 * | 8/2001 | Becker et al. ............ 320/112 |
| 6,340,879 | B1 | 1/2002 | Blacker |
| 6,348,777 | B1 | 2/2002 | Brown et al. |
| 6,426,628 | B1 | 7/2002 | Palm et al. |
| 6,541,980 | B2 * | 4/2003 | Maki ....................... 324/426 |
| 6,586,850 | B1 | 7/2003 | Powers |
| 6,891,438 | B2 * | 5/2005 | Arai et al. ................ 330/296 |
| 2002/0076071 | A1 | 6/2002 | Single |
| 2002/0137243 | A1 | 9/2002 | Chen et al. |
| 2004/0095020 | A1 * | 5/2004 | Kernahan et al. ......... 307/35 |
| 2006/0183965 | A1 | 8/2006 | Kasic et al. |
| 2006/0236532 | A1 | 10/2006 | Schuller |

FOREIGN PATENT DOCUMENTS

| | | |
|---|---|---|
| AU | 200176077 A1 * | 3/2002 |
| DE | 2720109 | 12/1977 |
| EP | 0175654 | 3/1986 |
| GB | 2279827 | 1/1995 |
| JP | 04334935 A * | 11/1992 |
| WO | WO 00/69012 | 11/2000 |
| WO | 0183855 | 11/2001 |
| WO | WO/02/060029 | 8/2002 |
| WO | 02/087685 | 11/2002 |
| WO | 02/089907 | 11/2002 |
| WO | 2004/091070 | 10/2004 |
| WO | 2005/004978 | 1/2005 |

OTHER PUBLICATIONS

International Preliminary Report on Patentability for PCT/AU2004/000920, dated Jan. 9, 2006.

International Search Report for PCT/AU2004/000464, dated May 5, 2004.

International Search Report for PCT/AU2004/000920, dated Nov. 17, 2004.

Written Opinion for PCT/AU2004/000464, dated May 5, 2004.

Written Opinion for PCT/AU2004/000920, dated Nov. 17, 2004.

* cited by examiner

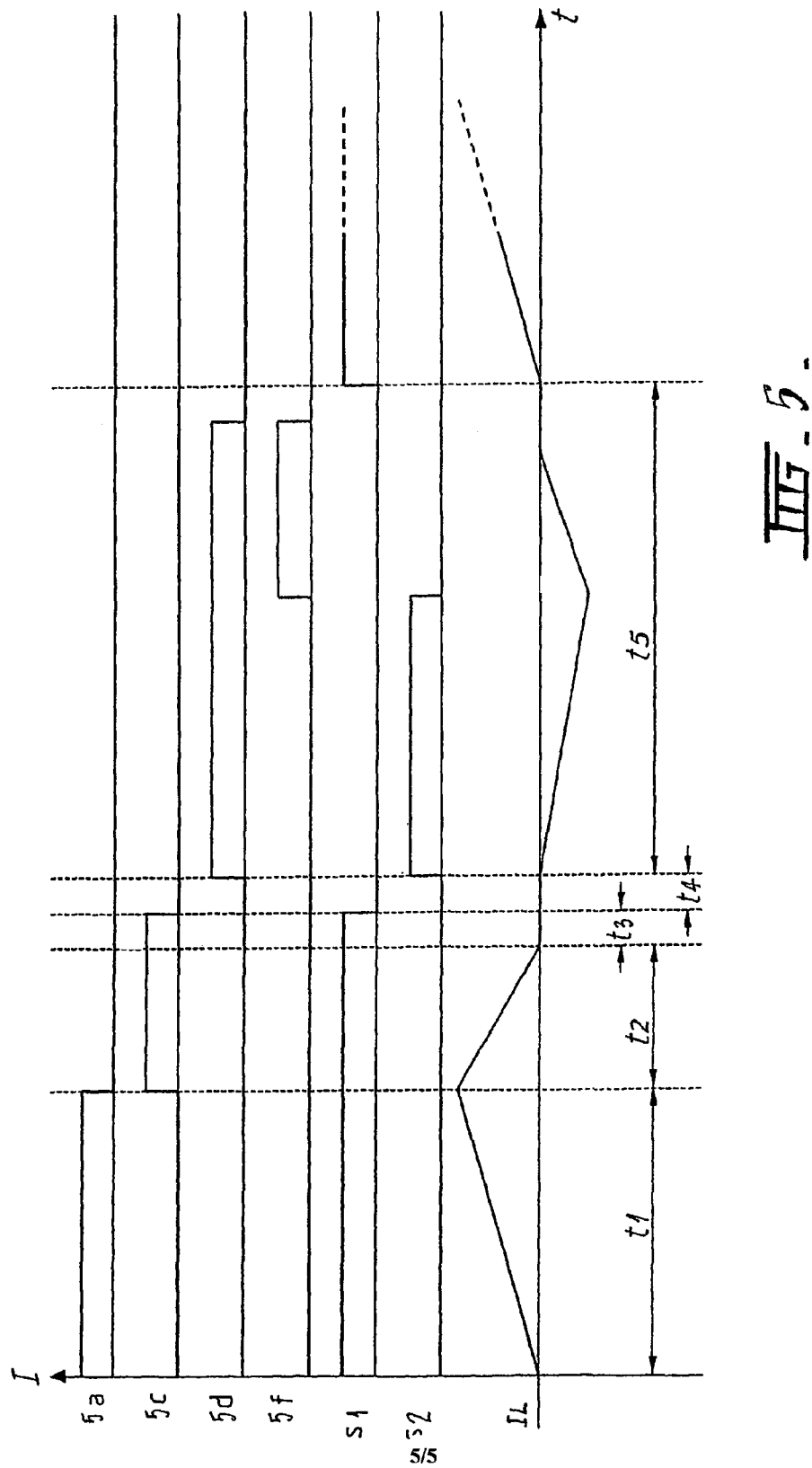

POWER MANAGEMENT SYSTEM

CROSS-REFERENCE TO RELATED APPLICATIONS

This application is a national stage application under 35 USC §371(c) of PCT Application No. PCT/AU 2004/000464, entitled "Power Management System," filed on Apr. 8, 2004, which claims the priority of Australian Patent No. 2003901730, filed on Apr. 11, 2003. The entire disclosure and contents of the above applications are hereby incorporated by reference.

BACKGROUND

1. Field of the Invention

This invention relates to a power management system and more particularly to a power management system for the supply of power to an implantable medical device, such as an implantable hearing prosthesis.

2. Related Art

Implantable medical devices, such as cochlear implants, middle ear implants, FES systems and the like, typically consist of two components, one part being an external component commonly referred to as a processor unit and the other part being an implanted internal component commonly referred to as a stimulator/receiver unit. Traditionally both of these components cooperate together to provide a desirable therapy to the implantee. In the case of implantable hearing prosthesis such as cochlear implants and/or middle ear implants, the external component has consisted of a microphone for detecting sounds, such as speech and environmental sounds, a speech processor that converts the detected sounds and particularly speech into a coded signal, a power source such as a battery and an external antenna/transmitter.

The coded signal output by the speech processor can be transmitted transcutaneously to the implanted stimulator/receiver unit situated within the head of the implantee. The transmission can occur through use of an inductive coupling provided between the external antenna transmitter and an implanted antenna/receiver which forms part of the stimulator/receiver unit. The communication serves to transmit the coded sound signal and to provide power to the implanted stimulator/receiver unit. The external part is generally worn outside the skin and can be positioned behind-the-ear like a traditional BTE hearing aid and contains the components mentioned previously.

The implanted stimulator/receiver unit typically includes the antenna/receiver that receives the coded signal and power from the external processor component, and a stimulator that processes the coded signal and outputs a stimulation signal to an assembly, which applies the stimulation to generate the desired therapy. In the case of a middle ear implant, the assembly may include a mechanical or hydromechanical actuator device that is coupled to the ossicles of the middle ear or directly to the inner ear for applying direct stimulation thereto, producing a hearing sensation corresponding to the originally detected sound. In the case of cochlear implants, the assembly may include an intra cochlear electrode assembly, which applies electrical stimulation directly to the auditory nerve producing a hearing sensation corresponding to the original detected sound. The implanted unit is located under the skin inside the mastoid and contains primarily means to demodulate or decode the signals transferred through the skin to drive an actuator or an electrode array and to convert the power transferred through the skin into an electric supply voltage. In known systems the implanted portion does not contain any independent power source and consequently the transcutaneous link must be in place and therefore the wearer must wear the external component permanently, which impedes the comfort of the wearer.

Due to other particular problems with the external components of existing hearing prosthetic devices, such as the aesthetics associated with wearing a visible external device, the wearer having to remove the device while showering or engaging in water related activities, and the likelihood that the alignment between the external and internal coils will be lost due to movements during sleep or physical activity, there exists a need to provide a system that allows for total freedom with improved simplicity and reliability. Consequently research has been directed to fully implantable hearing prosthetic systems that do not require external components for the operation thereof. This would include providing a medium-to-long term power source such as rechargeable batteries, in the implants to overcome the need for power to be continually transmitted to the implant from an external power source.

However certain challenges appear with providing implanted devices with such implanted power sources. Unlike ceramic capacitors used as present-day short-term energy reservoirs, a rechargeable battery degrades irreversibly during its lifetime. They can only undergo a particular maximum number of recharging cycles before the battery performance diminishes to a level where the battery is essentially unusable. The degradation is due to the decomposition of the electrolyte and due to electrode corrosion. The decomposition of the electrolyte can cause the generation of side products like hydrogen and other gases that tend to build up pressure in the battery enclosure and finally escape through flaws in the enclosure. Corrosion of electrodes leads to a reduction of the active surface area and may ultimately, if the battery continues to be charged and discharged, cause a short circuit inside the battery through metal spikes growing from one electrode to the other. Both effects lead to a reduction of the available battery capacity and ultimately to total failure. In the worst case, the implanted battery may rupture causing a severe threat to the health and well being of the wearer. Furthermore, if rechargeable batteries are discharged before being fully charged or conversely charged before being fully discharged, their overall capacity may be prematurely reduced.

Totally implantable hearing systems require a substantial amount of energy to be stored since the whole signal processing unit and supporting functions have to be supplied for a reasonable period of time. In order to be commercially viable, the required battery life per charge is generally considered as being in the order of a week. On the other hand, the number of recharging cycles of a storage battery is limited. Thus the capacity and ultimate size of an implanted battery must be made as large as possible. However, such application of large batteries causes further challenges, including that they require thick enclosures, that is considered dead space, in order to retain the pressure of evading gases. Large batteries are also prone to the occurrence of internal short circuiting and battery failures are due to their larger surface area. Furthermore, the larger the battery is, the more severe the thermal effect of a battery failure causing accumulative thermal damage to surrounding tissue.

It is desired to overcome, or at lease ameliorate any one or more of the shortcomings of prior arrangements.

SUMMARY

According to a first aspect of the invention there is provided a power management system for supplying power to an output circuit comprising: a plurality of rechargeable batteries; first conversion means for converting a supply voltage to a battery voltage to enable charging of one or more of the plurality of rechargeable batteries; and switch means to enable a selected battery from the plurality of batteries to be connected to the output circuit to enable the selected battery to be discharged through the output circuit.

According to a second aspect of the invention there is provided a method of managing the supply of power to an output circuit in a system that includes a plurality of rechargeable batteries, said method comprising the steps of: converting a supply voltage to a battery voltage to enable charging of one or more rechargeable batteries of the plurality of rechargeable batteries; and connecting one of the batteries in the plurality of rechargeable batteries, using switch means, to the output circuit to enable the connected battery to be discharged through the output circuit.

BRIEF DESCRIPTION OF THE DRAWINGS

Embodiments of the invention will hereinafter be described, by way of example only, with reference to the accompanying drawings, wherein:

FIG. 5 is a timing diagram showing the charging and discharging of rechargeable batteries in the power management system of FIG. 4.

DETAILED DESCRIPTION

Figure 1:
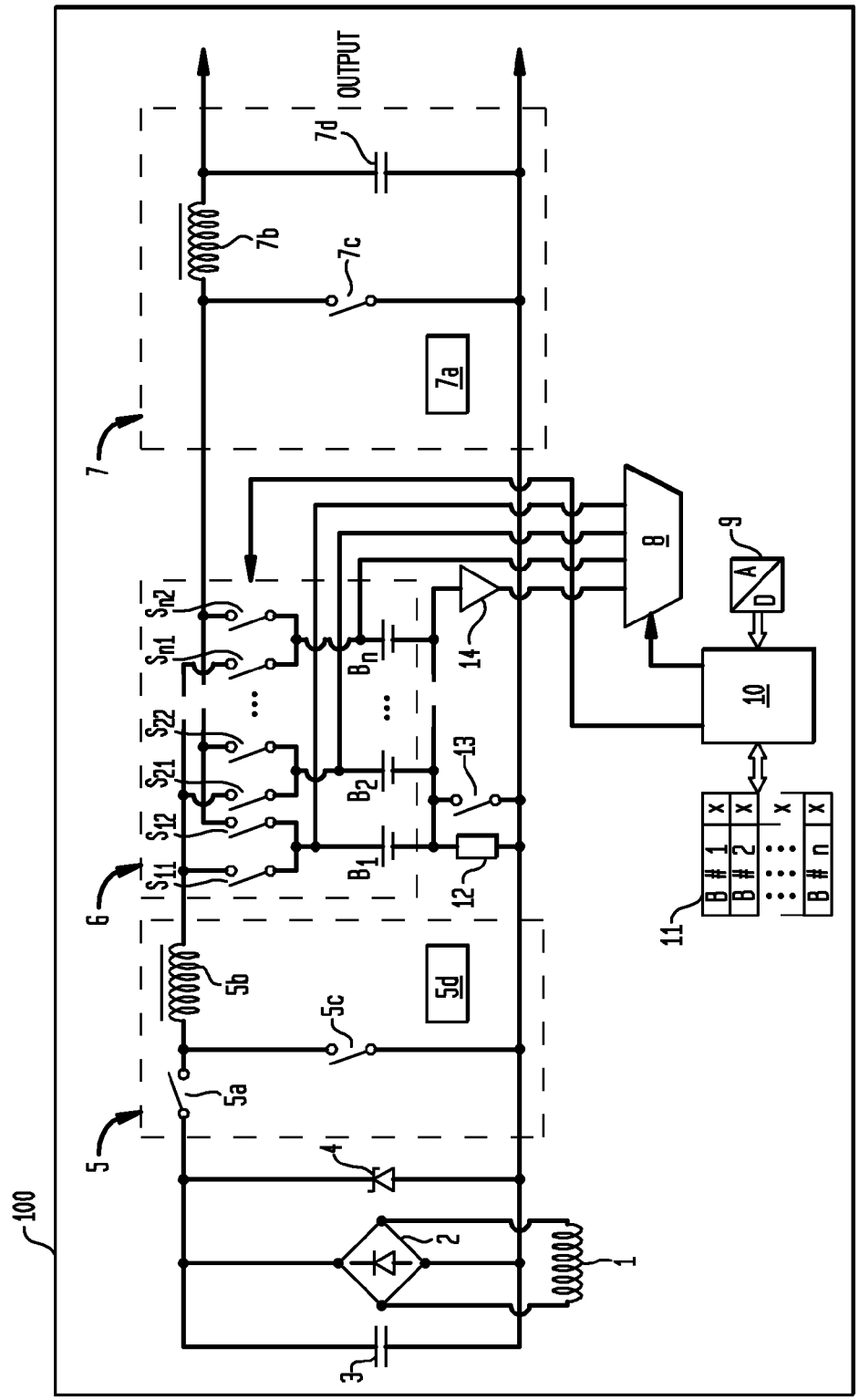
FIG. 1 is a block diagram of a power management system for supplying power to an output circuit according to a first embodiment of the invention.

With reference to FIG. 1 there is shown a block electrical circuit diagram of a multiple battery power supply particularly adapted for use in an implantable medical device, shown in FIG. 1 as an implantable hearing prosthesis 100 such as a cochlear implant, a middle ear implant or a hydromechanical inner ear stimulator. The power supply primarily consists of first conversion means in the form of an input voltage converter circuit 5, second conversion means in the form of an output voltage converter circuit 7, including a capacitor 7d, and an array of rechargeable batteries 6. An induction coil 1 detects and picks up varying magnetic fields from primary induction coils brought into proximity with the coil 1 and delivers an induction voltage at its terminals. Power transfer at a specific frequency can be made more efficient by optionally including the induction coil in a resonant circuit whereby a capacitor is connected in parallel or series to the coil 1. A rectifier 2 rectifies the AC voltage generated by the coil 1 or in other words converts the induction voltage into a DC voltage. The rectifier is shown as a full wave rectifier, however other embodiments such as half wave rectifiers or voltage doubling rectifiers can be used. A charging capacitor 3 removes the ripple of the rectified voltage delivered by the rectifier 2 and a voltage limiting device 4 absorbs excess voltage generated by the coil 1. After passing through the capacitor 3 and voltage limiting device 4, the DC voltage is passed to the input voltage converter circuit 5 which is preferably a step-down (or buck) type. It converts the voltage into an appropriate voltage to charge rechargeable batteries $B_1$, $B_2$ up to $B_n$. The input voltage converter circuit 5 is primarily made up of a charge switch 5a, an inductor 5b, a discharge switch 5c and a switch control unit 5d. The switch control unit 5d provides control signals to switches 5a and 5c as a function of the desired charge current and saturation current of the inductor 5b. The array 6 of rechargeable batteries comprises one rechargeable battery $B_1$ and at least one further rechargeable battery $B_2$ of the same cell chemistry and size. The number of individual batteries is arbitrary. Associated switches $S_{11}$ . . . $S_{n2}$ are included in a switch matrix that activates current paths from specific batteries to the input voltage converter circuit 5 and the output voltage converter circuit 7 respectively. The output voltage converter circuit 7 converts the voltage of the rechargeable batteries $B_1$ . . . $B_n$ into a voltage appropriate to supply an output circuit (not shown) such as the circuitry of an implant, like as a middle ear implant or cochlear implant. If a specific battery is connected to the input voltage converter 5, any other switch connecting a battery to the input voltage converter circuit 5 is inhibited in order to avoid parallel connections of batteries. This applies also to the output voltage converter circuit 7 respectively. Connected to each one of the batteries $B_1$ . . . $B_n$ between the positive terminal of each battery and its associated switch is a multiplexer 8. The output of the multiplexer 8 is linked to an analogue to digital converter circuit 9 which in turn is linked to a control unit 10. The multiplexer circuit 8 enables each individual positive terminal of the batteries $B_1$ . . . $B_n$ to be switched to the input of the analogue to digital converter 9 or alternatively the positive terminal of a shunt resistor 12 connected between the negative terminal of each battery and ground may be directly connected through the multiplexer 8 to the converter 9. The analogue to digital converter 9 measures the analogue battery voltage of each individual battery and converts it into a digital value which is then supplied to the control unit 10. Alternatively the analogue voltage drop across the shunt resistor 12 is converted into a digital value as well. The control unit 10 processes signals and data received from the converter 9 and a battery status register 11. The register 11 stores the charge and error status of each individual battery in the array of rechargeable batteries. The control unit 10 thus periodically checks for the presence of a DC voltage at the input of each of the batteries (or corresponding switch) and enables the charging of the batteries by activating the various switches in the switch bank. Preferably, charging is enabled at state of charge (SOC) at or below the preset working regime of a used cell chemistry. For example, this pre-set working regime can be between 15% and 95% SOC for nickel metal hydride (NiMH) or between 0% and 80% SOC for graphite/lithium cobaltate cells. The cell chemistry of the batteries determines the charging characteristics applied by the control unit 10. By periodically scanning the voltage and current condition of each individual battery it keeps a record of their SOC, where a fully charged cell has 100% SOC, in the battery status register 11. The control unit 10 can be parameterized in order to support different cell chemistries, for example NIMH or nickel cadmium (NiCd) at 1.2V, Li-Ion (graphite/lithium cobaltate 4.2V, lithium titanate-lithium manganese spinel 2.3V) and various cell sizes. It should be appreciated that the cell chemistries and working regimes mentioned above are illustrative examples only and it is envisaged that any suitable implantable battery is included within the scope of the present application, such as solid state systems based on the lithium ion battery or "rocking chair" principle or any other suitable implantable battery based on currently unknown chemical composition. On similar grounds, working regimes which may turn out to be more favorable under certain circumstances are included within the scope of the present application.

The charge current of each individual battery is measured as a voltage drop across the shunt resistor 12 and integrated over time. Thus the resistor 12 generates a voltage drop proportional to the charge/discharge current of each individual battery. The integrated charge for each individual battery is held in the battery status register 11 whose bit vector represents the SOC. If the SOC of the battery is above the optimum regime, for example a first percentage limit, the charge process for this battery is disabled and shown as a flag in a battery disable flag field in the register 11. A switch 13 is used to bridge the shunt resistor 12 if not used and a scaling amplifier 14 amplifies the voltage drop across the shunt resistor 12 to a voltage appropriate to the input voltage range of the analogue to digital converter 9.

The control unit 10 controls pseudo-simultaneous charging of all batteries by multiplexing the current paths going through each of the switches $S_{11}$ up to $S_{n1}$. The multiplex cycle ranges from about 1 ms up to 10 ms multiplied by the number of batteries n. As a consequence, the breakdown of the energy reservoir into n batteries does not extend the charging time since the overall charging current delivered is n times the charging current of any individual battery.

Figure 2:
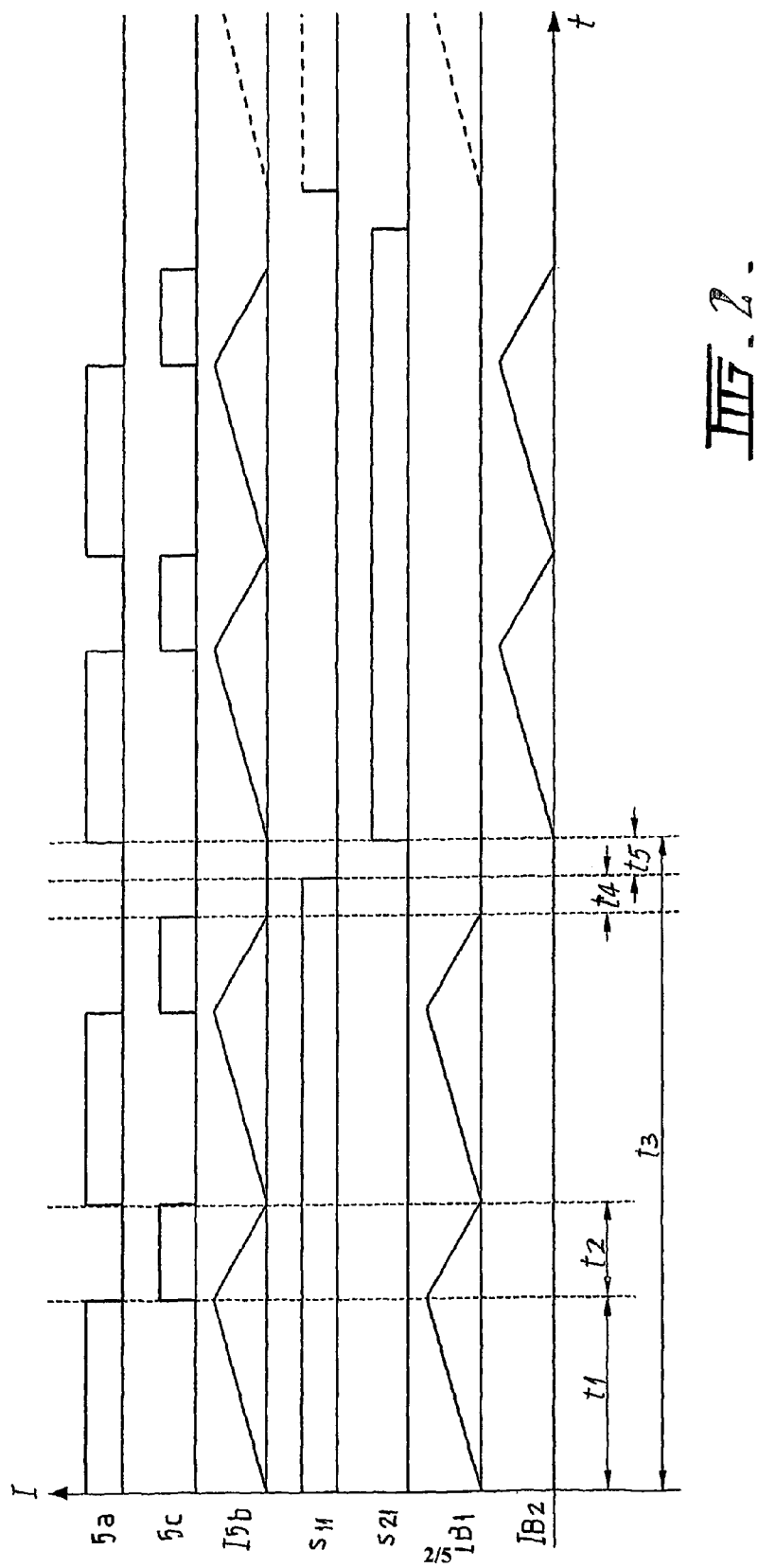
FIG. 2 is a timing diagram showing the charging of two batteries, from a plurality of rechargeable batteries, in the power management system of FIG. 1.
Figure 3:
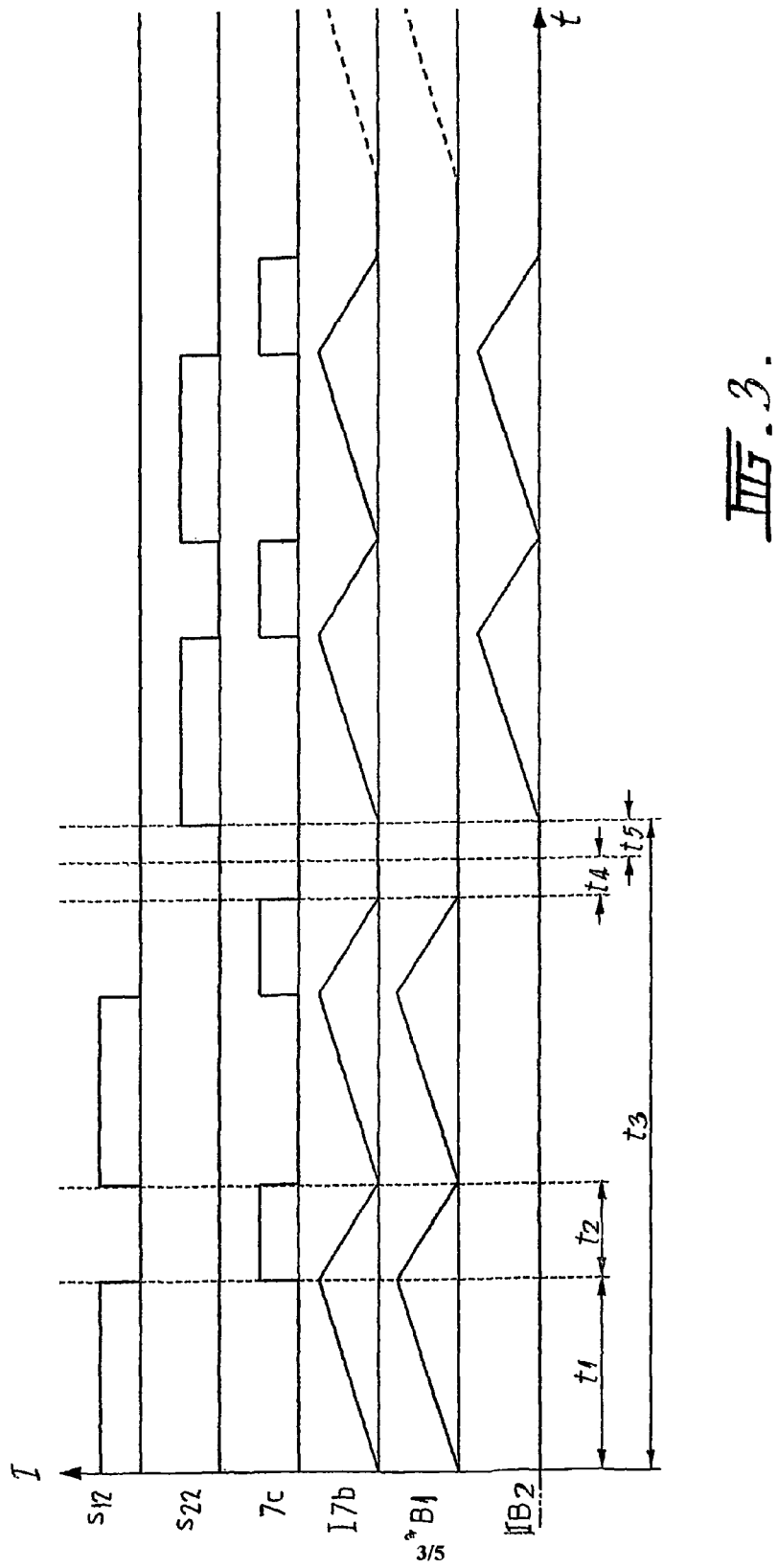
FIG. 3 is a timing diagram showing the discharging of two batteries from a plurality of rechargeable batteries in the power management system of FIG. 1.

With reference to each of the timing diagrams shown in FIGS. 2, 3 and 5 a logic "high" with respect to each switch means the switch is closed. Shown in FIG. 2 are various timing diagrams showing current versus time of an instance of pseudo-simultaneous charging of two batteries. It is to be noted that any number of batteries can be charged in such a fashion. Switch 5a is closed for a period of $t_1$ which causes the current in inductor 5b to constantly rise. Subsequently switch 5c in the input voltage converter circuit 5 closes for a period of $t_2$ (while switch 5a is open) which causes the inductor 5b to discharge and thereby making the current therethrough decrease. Periods $t_4$ and $t_5$ are non-overlapping times that allow the current in inductor 5b to decrease and to avoid parallel connection of batteries due to control signal delays. It is noted that for switch $S_{11}$ this is closed to enable current to flow through to battery $B_1$ and the current in that battery accordingly follows the current profile going through the inductor 5b over the period. The period $t_3$ is the multiplex period which can be multiples of the inductor charging cycles. Throughout the period $t_3$ it is noted that switch $S_{21}$ is open and therefore no current flows through to battery $B_2$. Once the second pulse in period $t_3$ pertaining to switch 5c closing finishes, in other words at the start of the period $t_4$ where switch 5c is open there is a delay across that period $t_4$ for the switch $S_{11}$ to open. Subsequently, in the next cycle when switch 5a is closed to let current flow through the inductor 5b, switch $S_{21}$ is closed to enable current to flow through to battery $B_2$ of which the current profile follows that of the current through inductor 5b in accordance with the opening and closing of switches 5a and 5c.

The control unit 10 also controls pseudo-simultaneous discharging of the batteries $B_1$ through to $B_n$ in order to optimise the system for an optimum working regime of the batteries. During discharge, the battery associated switches $S_{12} \ldots S_{n2}$, serve as multiplex switches as well as charge switches for the output converter inductor 7b. In this case the multiplexing among the switches is controlled by control unit 10 and the duration of the charge time for inductor 7b is controlled by switch control unit 7a. Thus whichever battery $B_1$ up to $B_n$ is discharging will have its respective output arm of each switch closed, for example $S_{12}$, $S_{22}$ up to $S_{n2}$. During discharge, the control unit 10 decrements automatically the bit vectors in the battery status register 11 representing the SOC of each individual battery according to the voltage drop across shunt resistor 12. Thus a digital bit value represents the state of charge of each battery at a particular time, whether that battery has discharged or not. If the SOC of any individual battery falls below the optimum regime, for example a second percentage limit, as discussed above, the discharge process of this specific battery is terminated.

In FIG. 3 there is shown a timing diagram of current versus time of pseudo-simultaneous discharging of two batteries. Period $t_3$ is the multiplex rate which can be multiples of inductor charge cycles $t_1+t_2$. Thus it can be seen with switch $S_{12}$ closed current discharges from battery $B_1$ increasing up to a point when the switch is opened and subsequently in period $t_2$ switch 7c is closed whereupon the current discharging for battery $B_1$ decreases to a point when switch 7c opens and switch $S_{12}$ closes at the end of period $t_2$. The current flowing through the inductor 7b follows the discharge current profile from battery $B_1$, as long as switch $S_{12}$ is closed. During all of this time $t_3$, the other switches remain open and in particular switch $S_{22}$ and therefore no current is being discharged from the battery $B_2$ as shown. In the next discharging cycle the switch $S_{22}$ is closed to enable current to be discharged from battery $B_2$ through the inductor 7b as shown in the next sequence or time period in FIG. 3.

The control unit 10 periodically checks for consistency between the voltage and SOC of each individual battery. Each battery features a specific voltage-charge characteristic, depending on cell chemistry. If, for instance, a particularly designed Li-Ion cell has a nominal voltage between 3.4 and 3.6V at 50% SOC when discharged with a current of 5 mA, consistency is recognised by the control unit 10 if the above conditions are verified. If, for instance, a cell voltage of only 2.5V is verified, corresponding to a typical lowest working voltage of a carbon/lithium cobaltate lithium ion battery with a copper current collector used in the negative (carbon) electrode, then control unit 10 judges that the battery is defective and marks a specific battery disable flag in the battery status register 11. As a consequence, the battery is kept isolated for the rest of its lifetime and is omitted from charging and discharging cycles.

Figure 4:
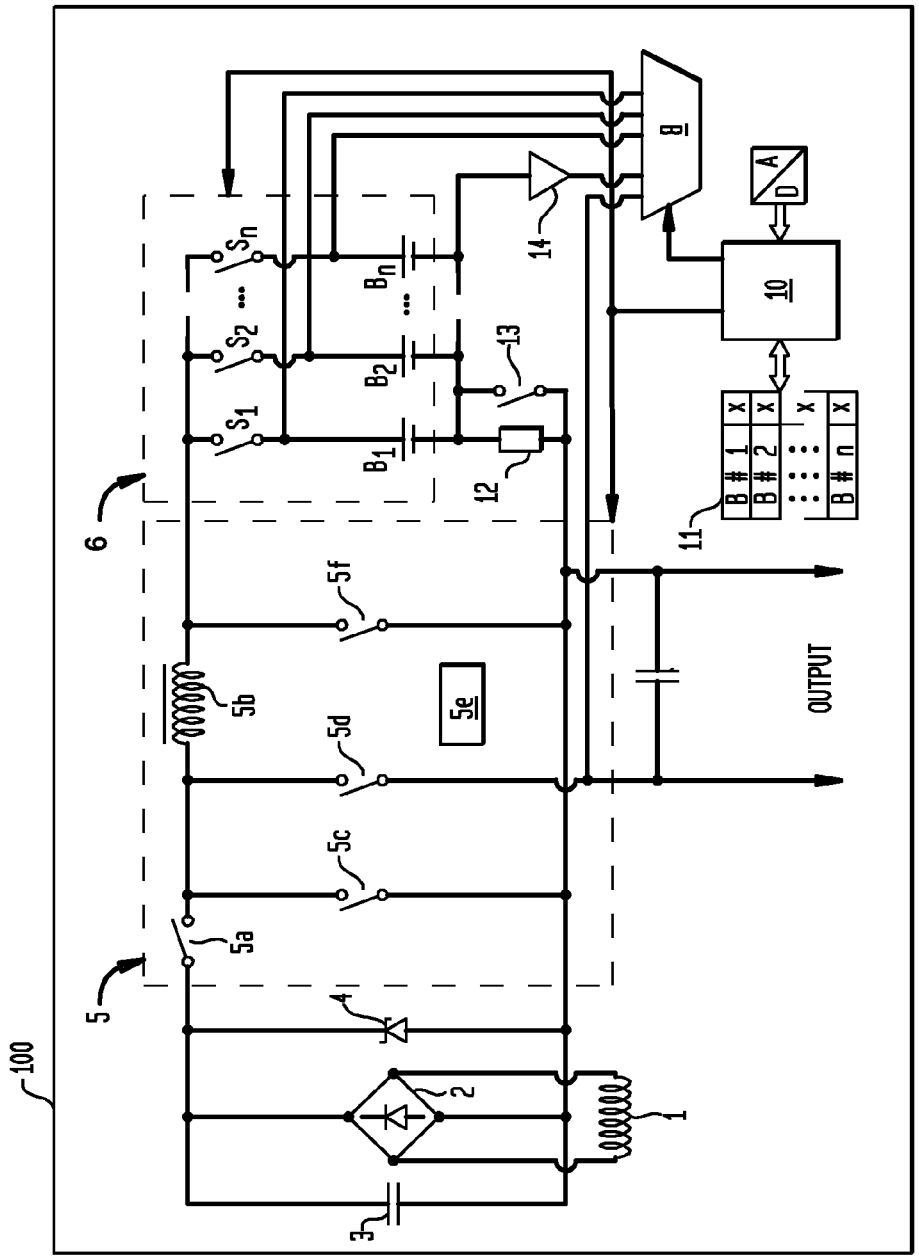
FIG. 4 is a block diagram of a power management system for providing power to an output circuit according to a second embodiment.

A further embodiment of the invention is shown in FIG. 4. Like reference numerals apply as in FIG. 1. The main difference between the embodiments shown in FIG. 4 and FIG. 1 is that in FIG. 4 a different switching arrangement allows a reuse of the original input voltage converter inductor 5b for the output voltage converter circuit 7 as well. In other words rather than using the inductor 7b in the output voltage converter circuit 7 of FIG. 1, this is now incorporated into a single inductor 5b for input and output conversion of voltages. Thus both terminals of the inductor 5b are respectively connected to the output (implant) circuit, such as an implantable hearing prosthesis circuit like a middle ear implant or cochlear implant, through respective switches 5d and 5f. A switch control unit 5e controls the switches 5a, 5c, 5d and 5f.

The main reason for using a single inductor for input and output voltage conversion is that inductors are generally bulky and consume a lot of space on a circuit board and are generally expensive devices in comparison to other devices. Particularly in implantable devices, space is scarce and therefore a refined embodiment is utilised in the circuit arrangement of FIG. 4. During charging, the inductor 5b can be used simultaneously for both converting the input voltage to charge the batteries $B_1$ up to $B_n$ and for converting the battery voltage to feed the cochlear implant circuit. An uninterrupted power supply of the implant circuit is granted through dispersing discharge cycles and charge cycles. The functions of the other components shown in the circuit arrangement of FIG. 4 are similar to those as in FIG. 1.

With reference to FIG. 5 there is shown a timing diagram of current versus time of a period of operation of the input/output converter switches where, for instance, battery $B_1$ is charged through switch $S_1$ and battery $B_2$ is discharged through switch $S_2$.

As can be seen in FIG. 5 with switch 5a closed it allows current to flow through the inductor 5b, indicated by current $I_L$ and switch $S_1$ is closed thereby charging battery $B_1$. The switch 5a is closed during the time interval $t_1$, and the switch 5c is opened during time interval $t_1$. At the end of time interval $t_1$, i.e. at the beginning of time interval $t_2$, the switch 5a will be opened and the switch 5c closed. The current through the inductor 5b is slowly discharged to ground during $t_2$, however switch $S_1$ remains closed until time $t_3$ expires when the switch 5c is open again. A new charging or discharging cycle then starts after time $t_4$ whereby switch 5d is closed as is switch $S_2$. Thus battery $B_2$ is discharging current through the inductor 5b in a reverse direction to be output to the implant circuit. Thus the current $I_L$ being the current through the inductor 5b is shown with a negative polarity increasing while switch $S_2$ is closed. At this time switch 5f is closed thereby discharging the current $I_L$ back to ground. Thus switch 5d remains closed for the entire duration for which switch $S_2$ and switch 5f are closed.

Closing

According to a first aspect of the invention there is provided a power management system for supplying power to an output circuit comprising: a plurality of rechargeable batteries; first conversion means for converting a supply voltage to a battery voltage to enable charging of one or more of the plurality of rechargeable batteries; and switch means to enable a selected battery from the plurality of batteries to be connected to the output circuit to enable the selected battery to be discharged through the output circuit.

The switch means may also be connected to the first conversion means to enable charging to the selected battery. A battery from the plurality of rechargeable batteries may be selected one at a time to provide charge to the output circuit. The system may further comprise a second conversion means connected between the output circuit and the switch means for converting the voltage of the selected battery to a voltage for use by the output circuit thereby discharging the selected battery. The first conversion means may also act as the second conversion means in that charging and discharging of any one of the rechargeable batteries is performed through the same conversion means.

The switch means may comprise a plurality of switches, each switch in the plurality of switches connecting a respective battery to the first conversion means and to the output circuit. The system may further comprise a control unit for controlling the switch means to either enable charging or discharging of a rechargeable battery. The system may further comprise multiplexer means having an input connected to one terminal of each battery to enable the voltage signals pertaining to each battery to be selected and forwarded to an analogue to digital converter.

The system may further comprise shunt impedance means connected to the other terminal of each battery to measure the charge current or discharge current of each battery, represented as a voltage drop across the shunt impedance means. The shunt impedance means may be connected in parallel to a shunt switch to short circuit the shunt impedance means when not in use.

The system may further comprise amplification means connected between the shunt impedance means and the multiplexer means to amplify the voltage drop across the shunt impedance means to the input voltage range of the analogue to digital converter. The analogue to digital converter may measure individual battery voltage of any one of the rechargeable batteries in the plurality of rechargeable batteries and may convert the measured voltage to a digital value. The analogue to digital converter may measure the voltage drop across the shunt impedance means and convert the measured voltage into a digital value.

The system may further comprise a register for storing information pertaining to each battery. The information may comprise any one or more of charge status of each battery, error status of each battery and a flag indicating whether a battery has been disabled from being charged or discharged.

The control unit may be in communication with the register and the analogue to digital converter for processing signals and data from the analogue to digital converter and from the register. The control unit may periodically sense the presence of a voltage at the input to the switch means. The control unit may select a battery to be charged or discharged on the basis of information stored in the register pertaining to a particular battery.

The second converter means may enable discharging of a battery such that charge in the selected battery is forwarded to the output circuit. The output circuit may form part of a medical prosthesis. Preferably the prosthesis is an implantable hearing prosthesis such as a cochlear implant or middle ear implant. The first conversion means may include an inductive means, one or more switch means and a switch control unit to enable charging and/or discharging of a rechargeable battery. The second conversion means may include an inductive means, one or more switch means and a switch control unit to enable discharging of a selected rechargeable battery. The supply voltage may be derived from an inductive means and rectified into a direct voltage to be applied to the inductive means of the first conversion means.

According to a second aspect of the invention there is provided a method of managing the supply of power to an output circuit in a system that includes a plurality of rechargeable batteries, said method comprising the steps of: converting a supply voltage to a battery voltage to enable charging of one or more rechargeable batteries of the plurality of rechargeable batteries; and connecting one of the batteries in the plurality of rechargeable batteries, using switch means, to the output circuit to enable the connected battery to be discharged through the output circuit.

The method may further comprise the step of converting the voltage output from the connected battery to a voltage for use by the output circuit.

The method may further comprise the step of providing the switch means in the form of a bank of switches, one for each rechargeable battery.

The method may further comprise the step of controlling the switch means to enable the charging or discharging of a selected battery on the basis of information stored in a register on each of the rechargeable batteries. It may further comprise multiplexing and measuring parameters, such as battery voltage, battery charge and battery current pertaining to each rechargeable battery for storage as digital values in the register.

The method may further comprise maintaining a record in the register of the state of charge of each rechargeable battery. It may further comprise providing an optimum range, as a percentage value of the state of charge, within which each rechargeable battery is charged and/or discharged. Where the charge of a battery is above a first percentage limit of the state of charge of that battery, the method may further comprise the step of disabling charging of that battery. Where the charge of a battery is below a second percentage limit of the state of charge, the method may further comprise the step of terminating the discharging of that battery.

The method may further comprise a means to flag out a battery which was judged as being defective by failing the check for consistency between cell voltage, current and state of charge being determined for each individual battery and to supersede this specific battery for future charging and discharging operations.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is

1. A method of managing the supply of power to an output circuit of an implantable hearing prosthesis comprising a voltage converter circuit and a plurality of rechargeable batteries, the method comprising the steps of:
    converting, with the voltage converter circuit, a supply voltage to a battery voltage;
    selectively connecting, using a switch matrix, a desired one of the batteries to the voltage converter circuit;
    charging the desired one of the batteries based on information on each of the batteries stored in a register;
    selectively connecting, based on the information on each of the batteries stored in the register and using the switch matrix, a selected one of the batteries to the voltage converter circuit to enable the selected one of the batteries to be discharged through the output circuit; and
    converting, with the voltage converter circuit, the voltage output from the selected one of the batteries to a voltage for use by the output circuit.

2. The method of claim 1, wherein the switch matrix comprises:
    a plurality of switches having at least one switch for each of the batteries.

3. The method of claim 1, further comprising the steps of:
    multiplexing and measuring parameters pertaining to each of the batteries for storage as digital values in the register.

4. The method of claim 3, further comprising the step of:
    maintaining a record in the register on the state of charge of each of the batteries.

5. The method of claim 4, further comprising the step of:
    providing an optimum range, as a percentage value of the state of charge, within which each battery may be charged and discharged.

6. The method of claim 5, further comprising the step of:
    disabling charging of the desired one of the batteries where the charge of the desired one of the batteries is above a first percentage limit of the state of charge.

7. The method of claim 5, further comprising the step of:
    terminating the discharging of the selected one of the batteries where the charge of the selected one of the batteries is below a second percentage limit of the state of charge.

8. An implantable hearing prosthesis, comprising:
    an output circuit; and
    a power management system configured to supply power to the output circuit comprising:
        a plurality of rechargeable batteries;
        a voltage converter circuit configured to convert a supply voltage to a battery voltage;
        a multiplexer having inputs each connected to a terminal of each of the batteries;
        a shunt resistor connected to a second terminal of each of the batteries, wherein the shunt resistor is connected in parallel to a shunt switch to short circuit the resistor when the resistor is not in use; and
        a control unit configured to control a switch matrix to selectively connect a desired one of the batteries to the voltage converter circuit for charging of the desired one of the batteries and to selectively connect a selected one of the batteries to the output circuit to enable the selected one of the batteries to be discharged through the output circuit,
    wherein the voltage converter circuit further connects the output circuit to the switch matrix and is configured to convert the voltage of the selected one of the batteries to a voltage for use by the output circuit.

9. The hearing prosthesis of claim 8, wherein the switch matrix comprises a plurality of switches enabling connection of the desired one of the batteries to the voltage converter circuit and of the selected one of the batteries to the output circuit.

10. The hearing prosthesis of claim 8, wherein the power management system further comprises:
    an amplifier connected between the shunt resistor and the multiplexer to amplify a voltage drop across the resistor to an input voltage range of an analog to digital converter.

11. The hearing prosthesis of claim 10, wherein the analog to digital converter measures individual battery voltage of any one of the batteries and converts the measured voltage to a digital value.

12. The hearing prosthesis of claim 10, wherein the analog to digital converter measures the voltage drop across the shunt resistor and converts the measured voltage into a digital value.

13. The hearing prosthesis of claim 12, further comprising:
    a register configured to store information pertaining to each battery.

14. The hearing prosthesis of claim 13, wherein said information comprises any one or more of charge status of each of the batteries, error status of each of the batteries or a flag identifying whether one of the batteries has been disabled from being charged or discharged.

15. The hearing prosthesis of claim 14, wherein the control unit is in communication with the register and with the analog to digital converter for processing signals and data from the analog to digital converter and from the register.

16. The hearing prosthesis of claim 15, wherein the control unit is configured to periodically sense the presence of a voltage at the input to the switch matrix.

17. The hearing prosthesis of claim 16, wherein the control unit is configured to select one of the batteries to be charged or discharged on the basis of information stored in the register.

18. The hearing prosthesis of claim 8, wherein the voltage converter circuit includes an inductor, one or more switches and a switch control unit to enable charging of the desired one of the batteries.

19. The hearing prosthesis of claim 8, wherein the voltage converter circuit includes an inductor, one or more switches and a switch control unit to enable discharging of the selected one of the batteries.

20. A system comprising:
a power supply having a first induction coil; and
an implantable hearing prosthesis comprising:
- a second induction coil configured to detect a varying magnetic field from the first induction coil when the first and second induction coils are in close proximity;
- an output circuit; and
- a power management system configured to receive a supply voltage from the second induction coil and provide power to the output circuit, comprising:
- a plurality of rechargeable batteries;
- a multiplexer having an input connected to one terminal of each of the batteries;
- a shunt resistor connected to a second terminal of each of the batteries, wherein the shunt resistor is connected in parallel to a shunt switch to short circuit the resistor when the resistor is not in use;
- a voltage converter circuit configured to convert the supply voltage to a battery voltage; and
- a switch matrix configured to selectively connect a desired one of the batteries to the voltage converter circuit for charging of the desired one of the batteries and for selectively connecting a selected one of the batteries to the output circuit to enable the selected one of the batteries to be discharged through the output circuit,
- wherein the voltage converter circuit further connects the output circuit to the switch matrix and is configured to convert the voltage of the selected one of the batteries to a voltage for use by the output circuit.

21. The system of claim 20, wherein the switch matrix comprises a plurality of switches enabling connection of the selected one of the batteries to the voltage converter circuit.

22. The system of claim 20, further comprising:
- a control unit configured to control the switch matrix to enable the charging of the desired one of the plurality of batteries and the discharging of the selected one of the batteries based on the state of charge of the plurality of batteries.

23. The system of claim 20, wherein the power management system further comprises:
- an amplifier connected between the shunt resistor and the multiplexer to amplify a voltage drop across the shunt resistor to the input voltage range of an analog to digital converter.

24. The system of claim 20, wherein the power management system further comprises:
- a register configured to store information pertaining to each of the batteries.

25. The system of claim 24, wherein said information comprises any one or more of charge status of each of the batteries, error status of each of the batteries or a flag identifying whether one of the batteries has been disabled from being charged or discharged.

26. The system of claim 20, wherein the voltage converter circuit is configured to enable discharging of the selected one of the batteries such that charge in the selected one of the batteries is forwarded to the output circuit.

27. The system of claim 20, wherein the voltage converter circuit includes an inductor, one or more switches and a switch control unit to enable charging of the desired one of the batteries.

* * * * *

UNITED STATES PATENT AND TRADEMARK OFFICE
CERTIFICATE OF CORRECTION

| | | |
|---|---|---|
| PATENT NO. | : 8,125,188 B2 | Page 1 of 1 |
| APPLICATION NO. | : 10/552974 | |
| DATED | : February 28, 2012 | |
| INVENTOR(S) | : Walter Döll et al. | |

It is certified that error appears in the above-identified patent and that said Letters Patent is hereby corrected as shown below:

Title page, item [75] inventor: should read as follows:
Dirk Fiedler.

Signed and Sealed this
First Day of May, 2012

David J. Kappos
*Director of the United States Patent and Trademark Office*